US012136383B2

(12) United States Patent
Kim et al.

(10) Patent No.: US 12,136,383 B2
(45) Date of Patent: Nov. 5, 2024

(54) PIXEL AND DISPLAY DEVICE INCLUDING THE SAME

(71) Applicant: Samsung Display Co., LTD., Yongin-si (KR)

(72) Inventors: Su Jin Kim, Yongin-si (KR); Chulkyu Kang, Yongin-si (KR); Donghyun Kim, Yongin-si (KR); Seon-Kyoon Mok, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/228,091

(22) Filed: Jul. 31, 2023

(65) Prior Publication Data

US 2024/0177650 A1 May 30, 2024

(30) Foreign Application Priority Data

Nov. 29, 2022 (KR) ........................ 10-2022-0162443

(51) Int. Cl.
*G09G 3/20* (2006.01)
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01); *G09G 2320/0233* (2013.01)

(58) Field of Classification Search
CPC ............. G09G 3/32; G09G 2300/0842; G09G 2310/0267; G09G 2310/0275; G09G 2320/0233
USPC ........................................... 345/55, 204, 156
See application file for complete search history.

(56) References Cited

U.S. PATENT DOCUMENTS

2016/0372039 A1* 12/2016 Chung ................. G09G 3/3233
2018/0166012 A1* 6/2018 Chung ................. G09G 3/3233
2021/0375201 A1* 12/2021 Park ...................... G09G 3/3233
2022/0415255 A1* 12/2022 Kim ...................... G09G 3/3233
2023/0245616 A1* 8/2023 Kim ...................... G09G 3/3233
345/55

FOREIGN PATENT DOCUMENTS

KR 101375831 B1 4/2014

* cited by examiner

*Primary Examiner* — Thuy N Pardo
(74) *Attorney, Agent, or Firm* — CANTOR COLBURN LLP

(57) ABSTRACT

In a pixel of a display device, a back gate control voltage is applied to a back gate electrode of a first transistor that operates as a driving transistor in an anode initialization period, and the back gate electrode of the first transistor is connected to an anode of a light emitting element in a light emitting period. A first transfer line is disposed apart from the first transistor in a first direction. A capacitor pattern is disposed apart from the first transistor in a second direction opposite to the first direction. A second transmission line is disposed between the first transistor and the capacitor pattern.

20 Claims, 9 Drawing Sheets

PIXEL AND DISPLAY DEVICE INCLUDING THE SAME

This application claims priority to Korean Patent Application No. 10-2022-0162443, filed on Nov. 29, 2022, and all the benefits accruing therefrom under 35 U.S.C. § 119, the content of which in its entirety is herein incorporated by reference.

BACKGROUND

1. Field

Embodiments of the invention relate to a pixel and a display device including the pixel. More particularly, embodiments of the invention relate to a pixel and a display device including the pixel configured to compensate for a threshold voltage of a driving transistor.

2. Description of the Related Art

Generally, a display device may include a display panel and a display panel driver. The display panel may include gate lines, data lines, emission lines and pixels. The display panel driver may include a gate driver for providing gate signals to the gate lines, a data driver for providing data voltages to the data lines, an emission driver for providing emission signals to the emission lines, and a driving controller for controlling the gate driver, the data driver and the emission driver.

SUMMARY

In a display device, differences in characteristics, such as threshold voltage and mobility, of driving transistors in pixels may occur due to process deviation. When threshold voltages of driving transistors in pixels are different from each other, driving currents of the driving transistors may become different from each other. Accordingly, a stain may be recognized on a display panel due to a luminance deviation between the pixels.

Embodiments of the invention provide a pixel configured to compensate for a threshold voltage of a driving transistor.

Embodiments of the invention provide a display device including the pixel.

In an embodiment of a pixel according to the invention, the pixel includes a first transistor which generates a driving current, a light emitting element which emits light based on the driving current, a second transistor which applies a data voltage to a second electrode of the first transistor in response to a write signal, a third transistor which diode-connects the first transistor in response to the write signal, a fourth transistor which applies a reference voltage to a gate electrode of the first transistor in response to an initialization signal, a fifth transistor which applies a first power supply voltage to a first electrode of the first transistor in response to an emission signal, a sixth transistor which connects the first transistor and the light emitting element in response to the emission signal, a seventh transistor which applies an initialization voltage to an anode of the light emitting element in response to a bias signal, an eighth transistor which applies a back gate control voltage to a back gate electrode of the first transistor in response to the bias signal, a ninth transistor which connects the back gate electrode of the first transistor and the anode of the light emitting element in response to the emission signal, and a storage capacitor connected between the gate electrode of the first transistor and the seventh transistor.

In an embodiment, a first transfer line, to which the write signal is applied, may be disposed apart from the first transistor in a first direction, a capacitor pattern constituting the storage capacitor may be disposed apart from the first transistor in a second direction opposite to the first direction, and a second transfer line, to which the emission signal is applied, may be disposed between the first transistor and the capacitor pattern.

In an embodiment, a fourth transfer line, to which the initialization signal is applied, may be disposed apart from the first transfer line in the first direction.

In an embodiment, a third transfer line, to which the bias signal is applied, may be disposed apart from the first transfer line in the second direction.

In an embodiment, the third transfer line may be disposed apart from the second transfer line in the second direction.

In an embodiment, the third transfer line may be disposed between the second transfer line and the capacitor pattern.

In an embodiment, the third transfer line may be disposed apart from the capacitor pattern in the second direction.

In an embodiment, the second transistor and the third transistor may be commonly connected to the first transfer line.

In an embodiment, the fifth transistor, the sixth transistor, and the ninth transistor may be commonly connected to the second transfer line.

In an embodiment, the seventh transistor and the eighth transistor may be commonly connected to the third transfer line.

In an embodiment, a frame period for the pixel may include an anode initialization period in which the pixel performs an anode initialization operation, a threshold voltage compensation period in which the pixel performs a threshold voltage compensation operation, and a light emitting period in which the pixel performs a light emitting operation.

In an embodiment, in the anode initialization period, the eighth transistor may be turned on in response to the bias signal having an active level to apply the back gate control voltage to the back gate electrode of the first transistor.

In an embodiment, in the threshold voltage compensation period, the third transistor may be turned on in response to the write signal having an active level to compensate for a threshold voltage of the first transistor.

In an embodiment, in the light emitting period, the ninth transistor may be turned on in response to the emission signal having an active level to apply a voltage of the back gate electrode of the first transistor to the anode.

In an embodiment of a display device according to the invention, the display device includes a display panel including a pixel, a gate driver which applies a write signal, an initialization signal, and a bias signal to the pixel, an emission driver which applies an emission signal to the pixel, and a driving controller which controls the gate driver and the emission driver. In such an embodiment, the pixel includes, a first transistor which generates a driving current, a light emitting element which emits light based on the driving current, a second transistor which applies a data voltage to a second electrode of the first transistor in response to the write signal, a third transistor which diode-connects the first transistor in response to the write signal, a fourth transistor which applies a reference voltage to a gate electrode of the first transistor in response to the initialization signal, a fifth transistor which applies a first power supply voltage to a first electrode of the first transistor in response to the emission signal, a sixth transistor which connects the first transistor and the light emitting element in response to the emission signal, a seventh transistor which applies an initialization voltage to an anode of the light emitting element in response to the bias signal, an eighth transistor which applies a back gate control voltage to a back gate electrode of the first transistor in response to the bias signal, a ninth transistor which connects the back gate electrode of the first transistor and the anode of the light emitting element in response to the emission signal, and a storage capacitor connected between the gate electrode of the first transistor and the seventh transistor. In such an embodiment, a first transfer line, to which the write signal is applied, is disposed apart from the first transistor in a first direction, a capacitor pattern constituting the storage capacitor is disposed apart from the first transistor in a second direction opposite to the first direction, and a second transfer line, to which the emission signal is applied, is disposed between the first transistor and the capacitor pattern.

In an embodiment, a fourth transfer line, to which the initialization signal is applied, may be disposed apart from the first transfer line in the first direction.

In an embodiment, a third transfer line, to which the bias signal is applied, may be disposed apart from the first transfer line in the second direction.

In an embodiment, the third transfer line may be disposed apart from the second transfer line in the second direction.

In an embodiment, the third transfer line may be disposed between the second transfer line and the capacitor pattern.

In an embodiment, the third transfer line may be disposed apart from the capacitor pattern in the second direction.

In an embodiment, a frame period for the pixel may include an anode initialization period in which the pixel performs an anode initialization operation, a threshold voltage compensation period in which the pixel performs a threshold voltage compensation operation, and a light emitting period in which the pixel performs a light emitting operation.

According to embodiments of the pixel and the display device including the pixel, the back gate control voltage may be applied to the back gate electrode of the first transistor that operates as a driving transistor in the anode initialization period, and the back gate electrode of the first transistor may be connected to the anode of the light emitting element in the light emitting period. In such embodiments, the first transfer line may be disposed apart from the first transistor in the first direction, the capacitor pattern may be disposed apart from the first transistor in the second direction opposite to the first direction, and the second transmission line may be disposed between the first transistor and the capacitor pattern. Accordingly, an image may be displayed with uniform luminance, and a display quality may be enhanced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
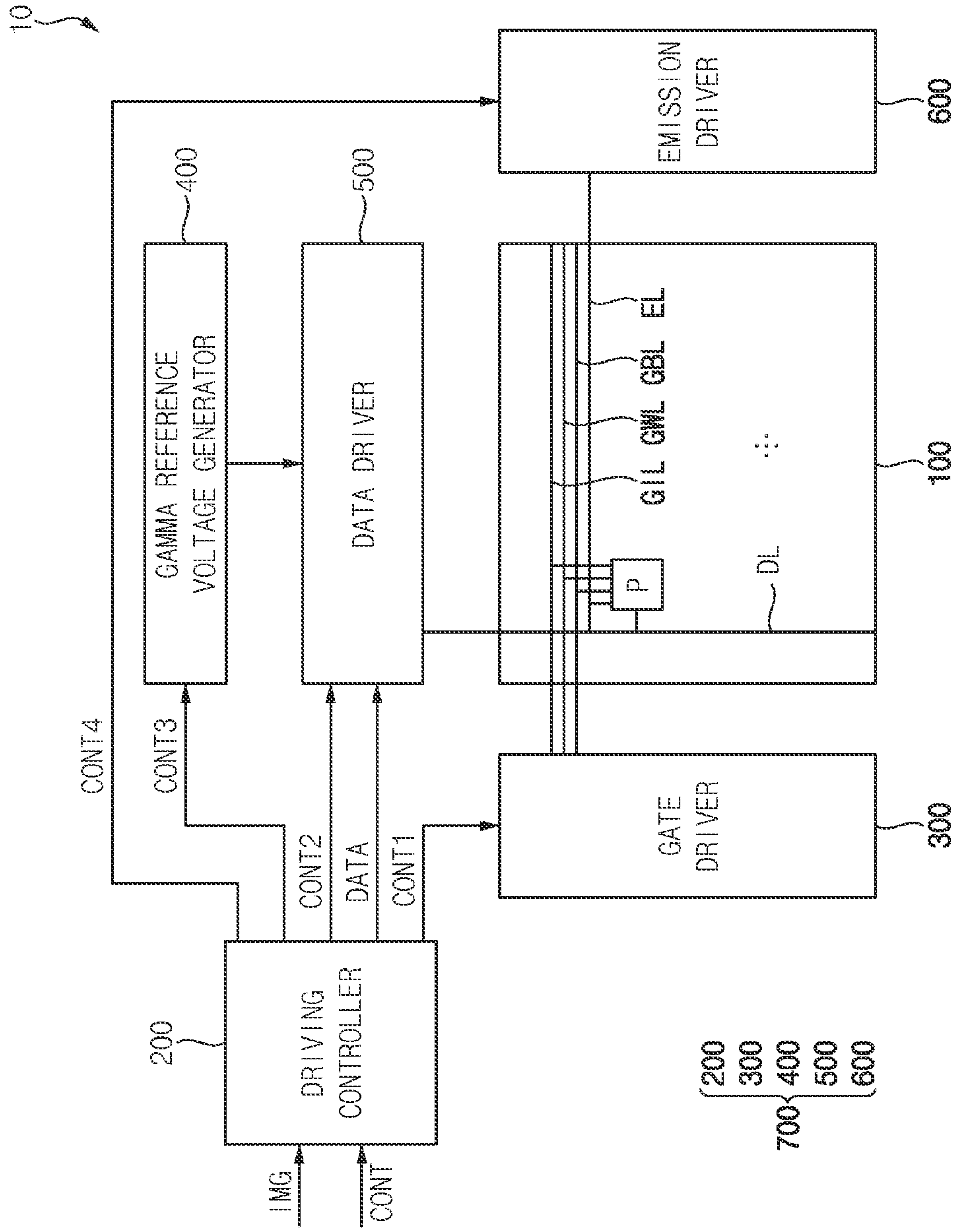
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device according to embodiments.

Referring to FIG. 1, an embodiment of the display device 10 may include a display panel 100 and a display panel driver 700. The display panel driver 700 may include a driving controller 200, a gate driver 300, a gamma reference voltage generator 400, a data driver 500, and an emission driver 600.

In an embodiment, for example, the driving controller 200 and the data driver 500 may be integrally formed with each other (e.g., as a single driver, module or chip). In an embodiment, for example, the driving controller 200, the gamma reference voltage generator 400, and the data driver 500 may be integrally formed with each other. In an embodiment, for example, the driving controller 200, the gate driver 300, the gamma reference voltage generator 400, and the data driver 500 may be integrally formed with each other. In an embodiment, for example, the driving controller 200, the gate driver 300, the gamma reference voltage generator 400, the data driver 500, and the emission driver 600 may be integrally formed with each other. A driving module including at least the driving controller 200 and the data driver 500 which are integrally formed may be referred to as a timing controller embedded data driver (TED).

The display panel 100 may include a display region, in which an image is displayed, and a peripheral region disposed adjacent to the display region.

In an embodiment, for example, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel 100 includes gate lines GIL, GWL, GBL, data lines DL, emission lines EL, and pixels P electrically connected to the gate lines GIL, GWL, GBL, the data lines DL, and the emission lines EL.

The driving controller 200 may receive input image data IMG and an input control signal CONT from an external device. In an embodiment, for example, the input image data IMG may include red image data, green image data, and blue image data. The input image data IMG may further include white image data. Alternatively, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generates the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the third control signal CONT4 to the emission driver 600.

The gate driver 300 may generate gate signals driving the gate lines GTL, GWL, GBL in response to the first control signal CONT1 received from the driving controller 200. The gate driver 300 may output the gate signals to the gate lines GIL, GWL, GBL. In an embodiment, for example, the gate driver 300 may sequentially output the gate signals to the gate lines GTL, GWL, GBL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed (e.g., integrated) in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into the data voltage in analog form using the gamma reference voltage VGREF. The data driver 500 may output the data voltage to the data line DL.

The emission driver 600 may generate emission signals for driving the emission lines EL in response to the fourth control signal CONT4 received from the driving controller 200. The emission driver 600 may output the emission signals to the emission lines EL.

Figure 2:
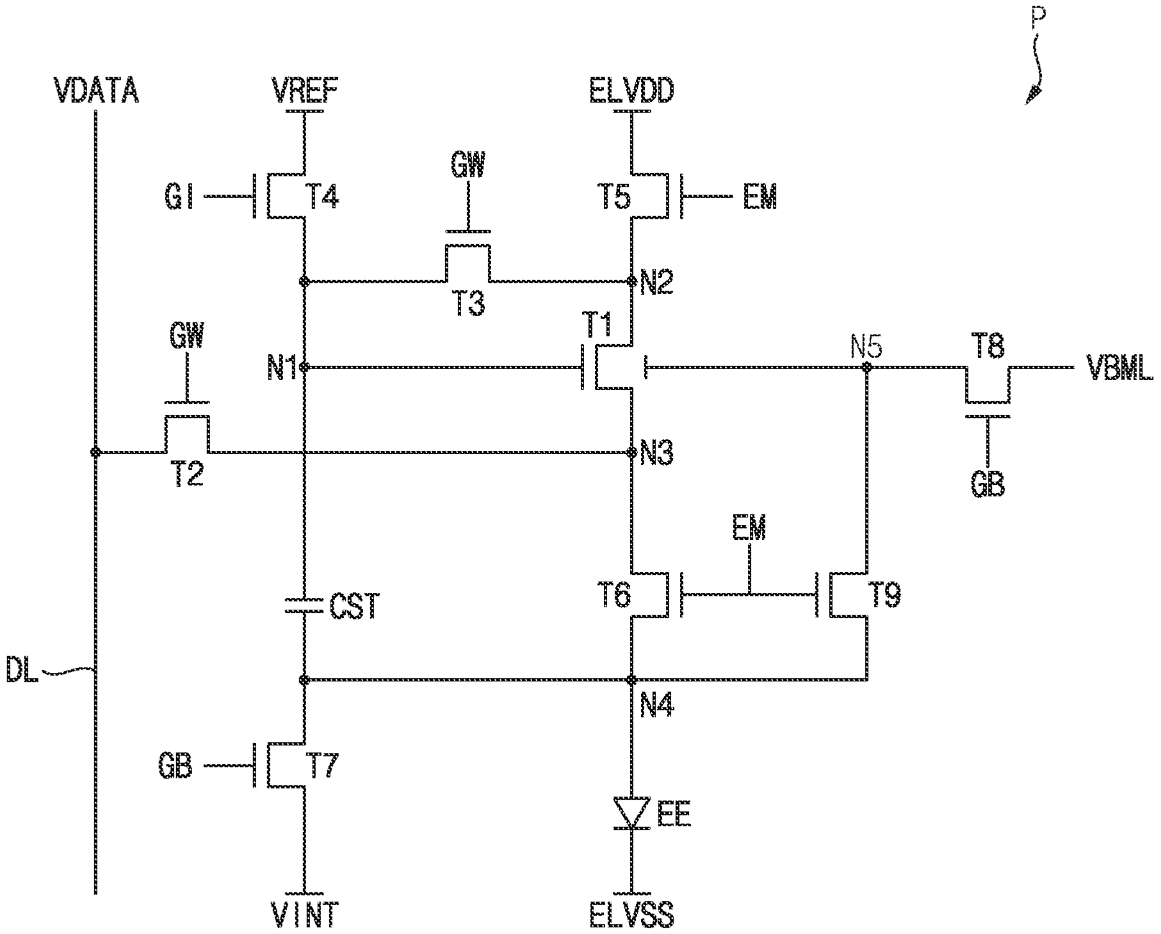
FIG. 2 is a circuit diagram illustrating an embodiment of a pixel included in the display device in FIG. 1.

FIG. 2 is a circuit diagram illustrating an embodiment of a pixel included in the display device in FIG. 1.

Referring FIG. 1 and FIG. 2, an embodiment of the pixel P may include a first transistor T1, a second transistor T2, a third transistor T3, a fourth transistor T4, a fifth transistor T5, a sixth transistor T6, a seventh transistor T7, an eighth transistor T8, a ninth transistor T9, a light emitting element EE, and a storage capacitor CST.

The first transistor T1 (e.g., a driving transistor) may include a gate electrode connected to a first node N1, a first electrode connected to a second node N2, and a second electrode connected to a third node N3. The first transistor T1 may generate a driving current flowing to the light emitting element EE based on a voltage of the gate electrode (i.e., the first node N1) of the first transistor T1.

The second transistor T2 may include a gate electrode that receives a write signal GW, a first electrode connected to the data line DL, and a second electrode connected to the third node N3. When the second transistor T2 is turned on in response to the write signal GW, the data voltage VDATA applied through the data line DL may be applied to the second electrode (i.e., the third node N3) of the first transistor T1.

The third transistor T3 may include a gate electrode that receives the write signal GW, a first electrode connected to the first node N1, and a second electrode connected to the second node N2. The third transistor T3 may diode-connect the first transistor T1 (i.e., connect the first transistor T1 to be in a diode configuration) in response to the write signal GW.

The fourth transistor T4 may include a gate electrode that receives an initialization signal GI, a first electrode that receives a reference voltage VREF, and a second electrode connected to the first node N1. When the fourth transistor T4 is turned on in response to the initialization signal GI, the reference voltage VREF may be applied to the gate electrode (i.e., the first node N1) of the first transistor T1.

The fifth transistor T5 may include a gate electrode that receives an emission signal EM, a first electrode that receives a first power supply voltage ELVDD, and a second electrode connected to the second node N2. When the fifth transistor T5 is turned on in response to the emission signal EM, the first power supply voltage ELVDD may be applied to the first electrode (i.e., the second node N2) of the first transistor T1.

The sixth transistor T6 may include a gate electrode that receives the emission signal EM, a first electrode connected to the third node N3, and a second electrode connected to the fourth node N4. When the sixth transistor T6 is turned on in response to the emission signal EM, the driving current generated by the first transistor T1 may be provided to the light emitting element EE.

The seventh transistor T7 may include a gate electrode that receives a bias signal GB, a first electrode that receives an initialization voltage VINT, and a second electrode connected to a fourth node N4. When the seventh transistor T7 is turned on in response to the bias signal GB, the initialization voltage VINT may be applied to the anode (i.e., the fourth node N4) of the light emitting element EE.

The eighth transistor T8 may include a gate electrode that receives the bias signal GB, a first electrode that receives a back gate control voltage VBML, and a second electrode connected to a fifth node N5. When the eighth transistor T8 is turned on in response to the bias signal GB, the back gate control voltage VBML may be applied to the back gate electrode (i.e., the fifth node N5) of the first transistor T1.

The ninth transistor T9 may include a gate electrode that receives the emission signal EM, a first electrode connected to the fifth node N5, and a second electrode connected to the anode (i.e., the fourth node N4) of the light emitting element EE. When the ninth transistor T9 is turned on in response to the emission signal EM, the back gate electrode of the first transistor T1 and the anode of the light emitting element EE may be connected to each other.

The light emitting element EE may include the anode connected to the fourth node N4 and a cathode that receives the second power supply voltage ELVSS. The light emitting element EE may emit light based on the driving current generated by the first transistor T1 while the fifth transistor T5 and the sixth transistor T6 are turned on in response to the emission signal EM.

The storage capacitor CST may include a first electrode connected to the gate electrode (i.e., the first node N1) of the first transistor T1 and a second electrode connected to the fourth node N4. The storage capacitor CST may store the data voltage VDATA applied from the data line DL through the second transistor T2.

Figure 3:
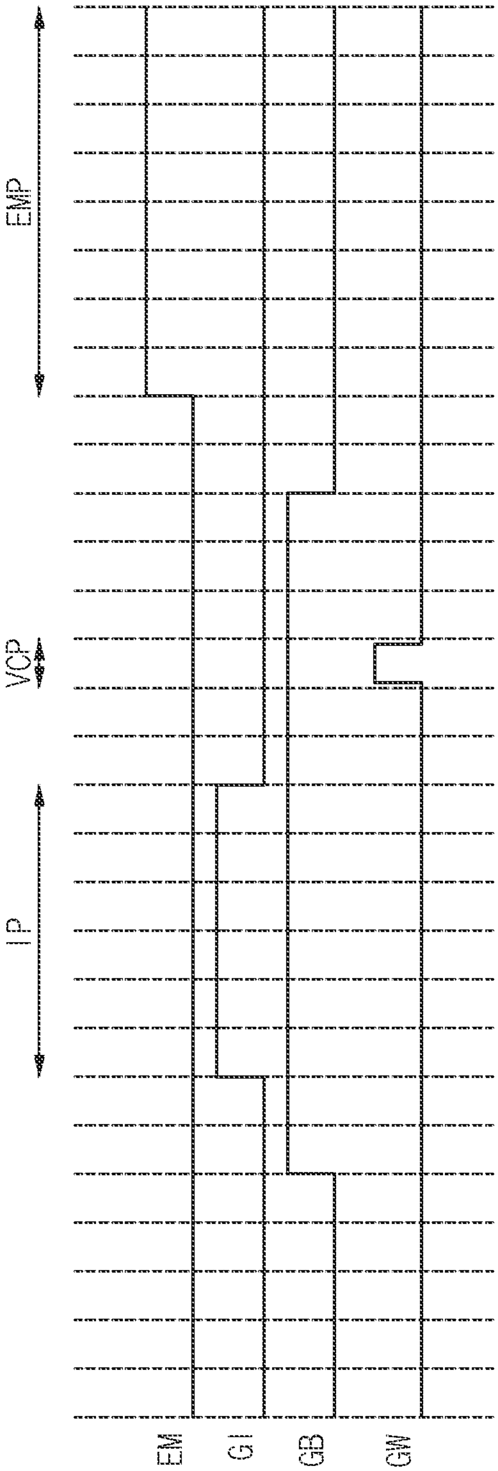
FIG. 3 is a signal timing diagram illustrating an initialization signal, a write signal, a bias signal, and an emission signal applied to the pixels of FIG. 2.
Figure 4:
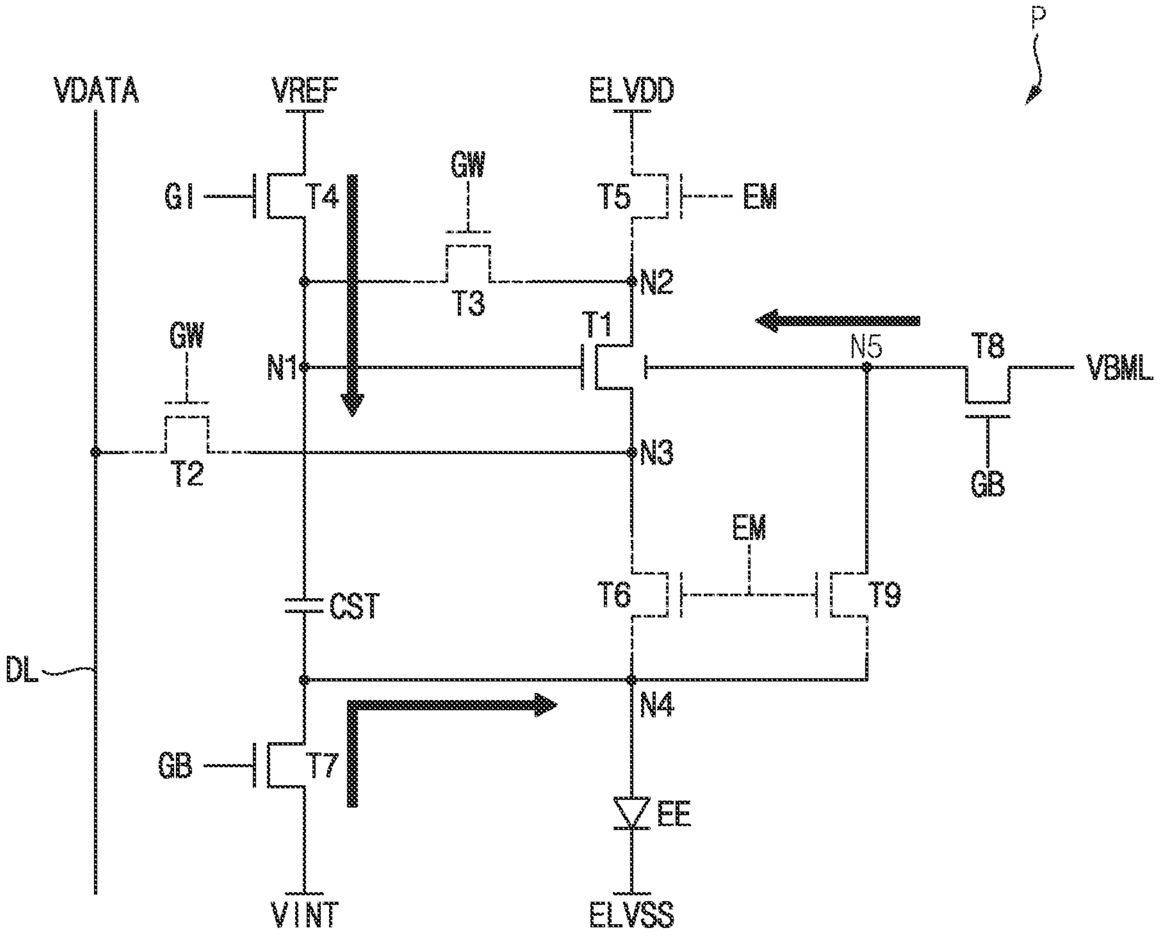
FIG. 4 is a circuit diagram illustrating the pixel of FIG. 2 operating in an anode initialization period.
Figure 5:
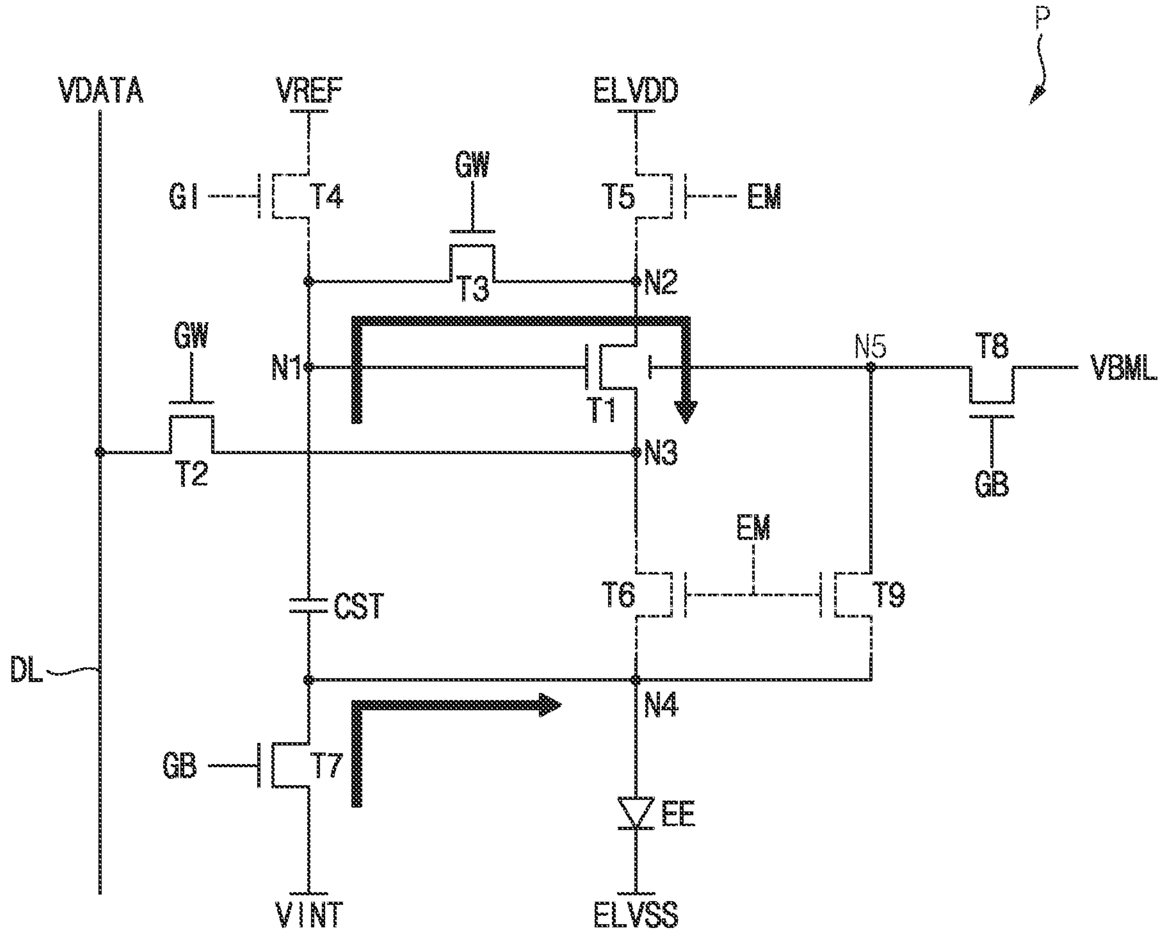
FIG. 5 is a circuit diagram illustrating the pixel of FIG. 2 operating in a threshold voltage compensation period.
Figure 6:
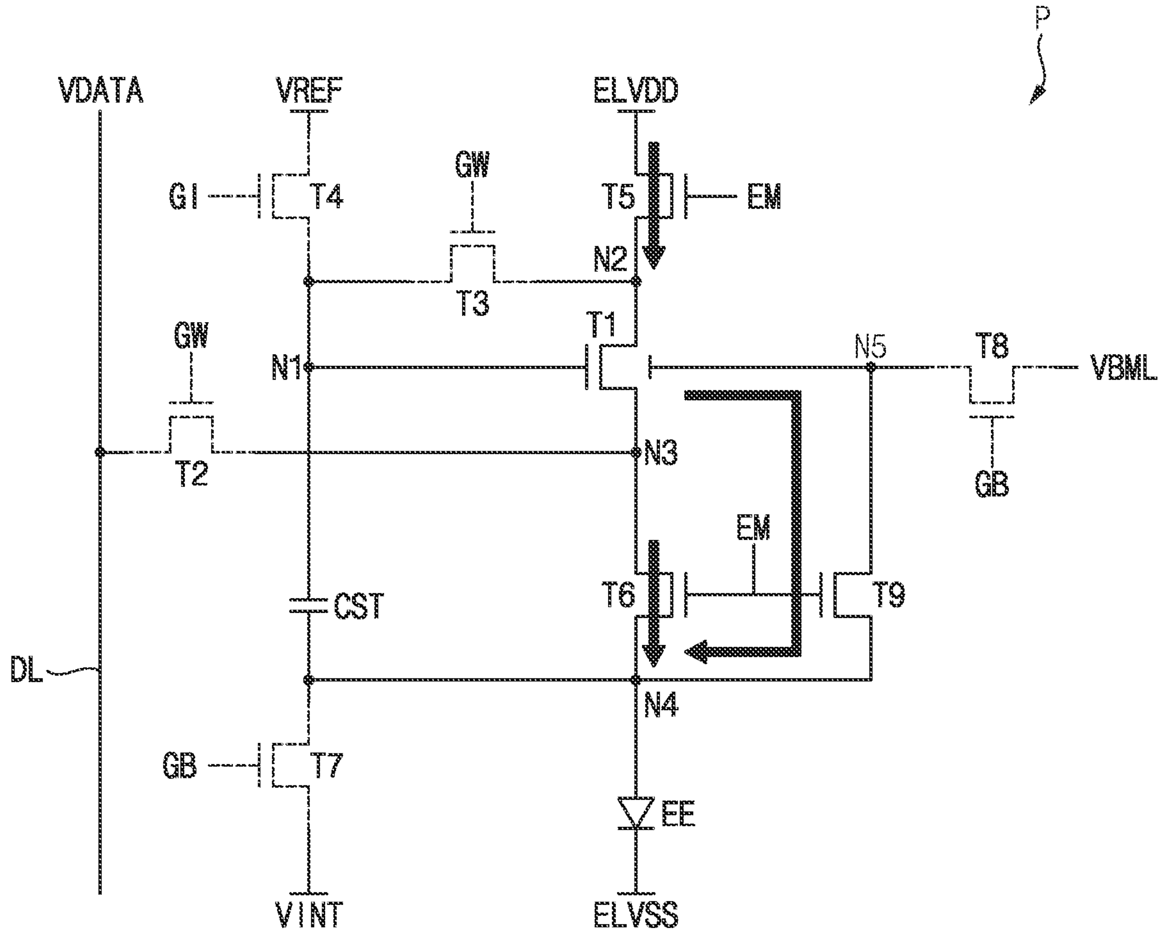
FIG. 6 is a circuit diagram illustrating the pixel of FIG. 2 operating in a light emitting period.

FIG. 3 is a signal timing diagram illustrating an initialization signal, a write signal, a bias signal, and an emission signal applied to the pixels of FIG. 2. FIG. 4 is a circuit diagram illustrating the pixel of FIG. 2 operating in an anode initialization period. FIG. 5 is a circuit diagram illustrating the pixel of FIG. 2 operating in a threshold voltage compensation period. FIG. 6 is a circuit diagram illustrating the pixel of FIG. 2 operating in a light emitting period.

Referring to FIGS. 1 to 6, a frame period for the pixel P may include an anode initialization period IP in which the pixel P performs a threshold voltage compensation operation, a threshold voltage compensation period VCP in which the pixel P performs a threshold voltage compensation operation, and a light emitting period EMP in which the pixel P performs a light emitting operation.

In the anode initialization period IP, the initialization signal GI and the bias signal GB may have an active level (e.g., high level), such that the fourth transistor T4 may be turned on in response to the initialization signal GI, and the seventh transistor T7 and the eighth transistor T8 may be turned on in response to the bias signal GB as shown in FIG. 4. Accordingly, the fourth transistor T4 may apply the reference voltage VREF to the gate electrode (i.e., the first node N1) of the first transistor T1. In an embodiment, the reference voltage VREF may have a voltage level such as the first power supply voltage ELVDD, but is not limited thereto. The seventh transistor T7 may apply the initialization voltage VINT to the anode of the light emitting element EE, and the eighth transistor T8 may apply the back gate control voltage VBML to the back gate electrode of the first transistor T1.

In the threshold voltage compensation period VCP, the write signal GW and the bias signal GB may have the active level, such that the second transistor T2 and the third transistor T3 may be turned on in response to the write signal GW, and the seventh transistor T7 and the eighth transistor T8 may be turned on in response to the bias signal GB, as shown in FIG. 5. Accordingly, the second transistor T2 may apply the data voltage VDATA to the second electrode (i.e., the third node N3) of the first transistor T1. The third transistor T3 may connect the first transistor T1. A voltage of the first electrode (i.e., the first node N1) of the storage capacitor CST may be a voltage in which the threshold voltage is added to the data voltage VDATA. Therefore, the threshold voltage of the first transistor T1 may be compensated. In addition, the eighth transistor T8 may apply the back gate control voltage VBML to the back gate electrode of the first transistor T1. The threshold voltage of the first transistor T1 may be determined by a voltage of the back gate electrode of the first transistor T1. In an embodiment, for example, where the first transistor T1 is a transistor of N-channel metal oxide semiconductor (NMOS), as a voltage difference between the back gate electrode of the first transistor T1 and the second electrode of the first transistor T1 decreases, the threshold voltage of the transistor T1 may increase. The eighth transistor T8 may compensate for the threshold voltage of the first transistor T1 by controlling the voltage of the back gate electrode of the first transistor T1. Thus, an image may be displayed in a uniform luminance, and a display quality may be enhanced.

In the light emitting period EMP, the emission signal EM may have the active level, such that the fifth transistor T5, the sixth transistor T6, and the ninth transistor T9 may be turned on in response to the emission signal EM, as shown in FIG. 6. Accordingly, the first transistor T1 may generate the driving current based on a voltage of the first node N1, that is, a voltage of the first electrode of the storage capacitor CST. In addition, the fifth transistor T5 and the sixth transistor T6 may flow the light emitting element EE between a line of the first power supply voltage ELVDD and a line of the second power supply voltage ELVSS, and the light emitting element EE may have emit light based on the driving current.

In a case, where the first transistor T1 is connected to the anode of the light emitting element EE by using only the sixth transistor T6, a voltage of the second electrode (i.e., the third node N3) of the first transistor T1 may be distorted by a leakage current of the first to seventh transistors T1 to T7, especially the leakage current of the first transistor T1 in the light emitting period EMP. For example, when the voltage of the second electrode of the first transistor T1 increases in the light emitting period EMP, the voltage difference between the back gate electrode of the first transistor T1 and the second electrode of the first transistor T1 may be reduced. For example, as the voltage difference between the back gate electrode of the first transistor T1 and the second electrode of the first transistor T1 decreases, the threshold voltage of the first transistor T1 may increase. When threshold voltages of first transistors T1 between the pixels P are different from each other, driving currents of the first transistors T1 between the pixels P may become different from each other. Accordingly, a stain may be recognized on the display panel 100 due to a luminance deviation between the pixels P.

In an embodiment of the invention, when the ninth transistor T9 is turned on in response to the emission signal EM, the first transistor T1 may be not only connected to the anode of the light emitting element EE through the sixth transistor T6 but also connected to the anode of the light emitting element EE through the ninth transistor T9. The ninth transistor T9 may be turned on in response to the emission signal EM having the active level, and apply the voltage of the back gate electrode of the first transistor T1 to the anode of the light emitting element EE. When the first transistor T1 is connected to the anode of the light emitting element EE through the sixth transistor T6 and the ninth transistor T9, the leakage current of the first transistor T1 may be controlled. Accordingly, the voltage of the second electrode of the first transistor T1 may not be distorted in the light emitting period EMP. In such an embodiment, the voltage difference between the back gate electrode of the first transistor T1 and the second electrode of the first transistor T1 is not changed, such that the threshold voltage of the first transistor T1 may not be changed. Thus, the image may be displayed in the uniform luminance, and the display quality may be enhanced.

Figure 7:
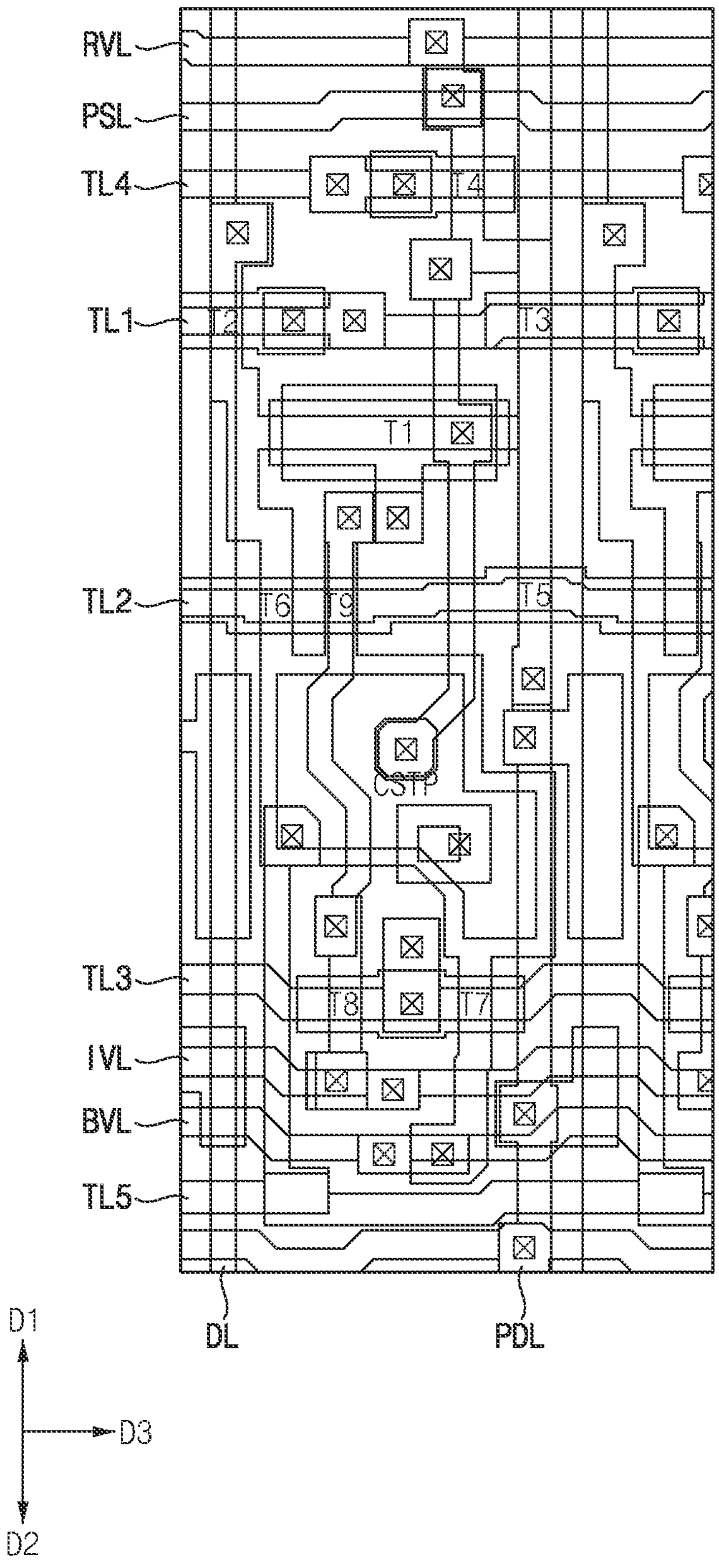
FIG. 7 is a diagram illustrating an embodiment of the pixel of FIG. 2.

FIG. 7 is a diagram illustrating an embodiment of the pixel of FIG. 2.

Referring to FIGS. 1 to 7, the display device 10 may include the pixel P.

In an embodiment, the pixel P may include the first to ninth transistor T1 to T9, a capacitor pattern CSTP, a first to fifth transfer line TL1 to TL5, a reference voltage line RVL, an initialization voltage line IVL, a back gate control voltage line BVL, the first power supply voltage line PDL, the second power supply voltage line PSL, and the data line DL.

The first to fifth transfer line TL1 to TL5, the reference voltage line RVL, the initialization voltage line IVL, the back gate control voltage line BVL and the first power supply voltage line PVL may extend in a third direction D3. The second power supply voltage line PDL and the data line DL may extend in a first direction D1 (or a second direction D2).

The first transfer line TL1 may be disposed apart from the first transistor T1 in the first direction D1. The capacitor pattern CSTP may be disposed apart from the first transistor T1 in the second direction D2 opposite to the first direction D1. The second transfer line TL2 may be disposed between the first transistor T1 and the capacitor pattern CSTP. The fourth transfer line TL4 may be disposed apart from the first transfer line TL1 in the first direction D1. The third transfer line TL3 may be disposed apart from the first transfer line TL1 in the second direction D2. The third transfer line TL3 may be disposed apart from the second transfer line TL2 in the second direction D2.

In an embodiment, the third transfer line TL3 may be disposed apart from the capacitor pattern CSTP in the second direction D2.

The capacitor pattern CSTP may constitute the storage capacitor CST.

The initialization signal (e.g., the initialization signal GI shown in FIG. 2) may be transferred to the fourth transistor T4 through the fourth transfer line TL4. The write signal (e.g., the write signal GW shown in FIG. 2) may be transferred to the second transistor T2 and the third transistor T3 through the first transfer line TL1. The second transistor T2 and the third transistor T3 may share (or be commonly connected to) the first transfer line TL1. The bias signal (e.g., the bias signal GB shown in FIG. 2) may be transferred to the seventh transistor T7 and the eighth transistor T8 through the third transfer line TL3. The seventh transistor T7 and the eighth transistor may share the third transfer line TL3.

The emission signal (e.g., the emission signal EM shown in FIG. 2) may be transferred to the fifth transistor T5, the sixth transistor T6 and the ninth transistor T9 through the second transfer line TL2. The fifth transistor T5, the sixth transistor T6, and the ninth transistor T9 may share the second transfer line TL2.

In an embodiment, the fifth transfer line TL5 may be a repair line.

The reference voltage (e.g., the reference voltage VREF shown in FIG. 2) may be transferred to the fourth transistor T4 through the reference voltage line RVL. The initialization voltage (e.g., the initialized voltage VINT shown in FIG. 2) may be transferred to the seventh transistor T7 through the initialization voltage line IVL. The back gate control voltage (e.g., the back gate control voltage VBML shown in FIG. 2) may be transferred to the back gate electrode of the first transistor T1 through the back gate control voltage line BVL. The first power supply voltage (e.g., the first power supply voltage ELVDD shown in FIG. 2) may be transferred to the fifth transistor T5 through the first power supply voltage line PDL. The second power supply voltage (e.g., the second power supply voltage ELVSS shown in FIG. 2) may be transferred to the light emitting element EE through the second power supply voltage line PSL. The data voltage (e.g., the data voltage VDATA shown in FIG. 2) may be transferred to the second transistor T2 through the data line DL.

Figure 8:
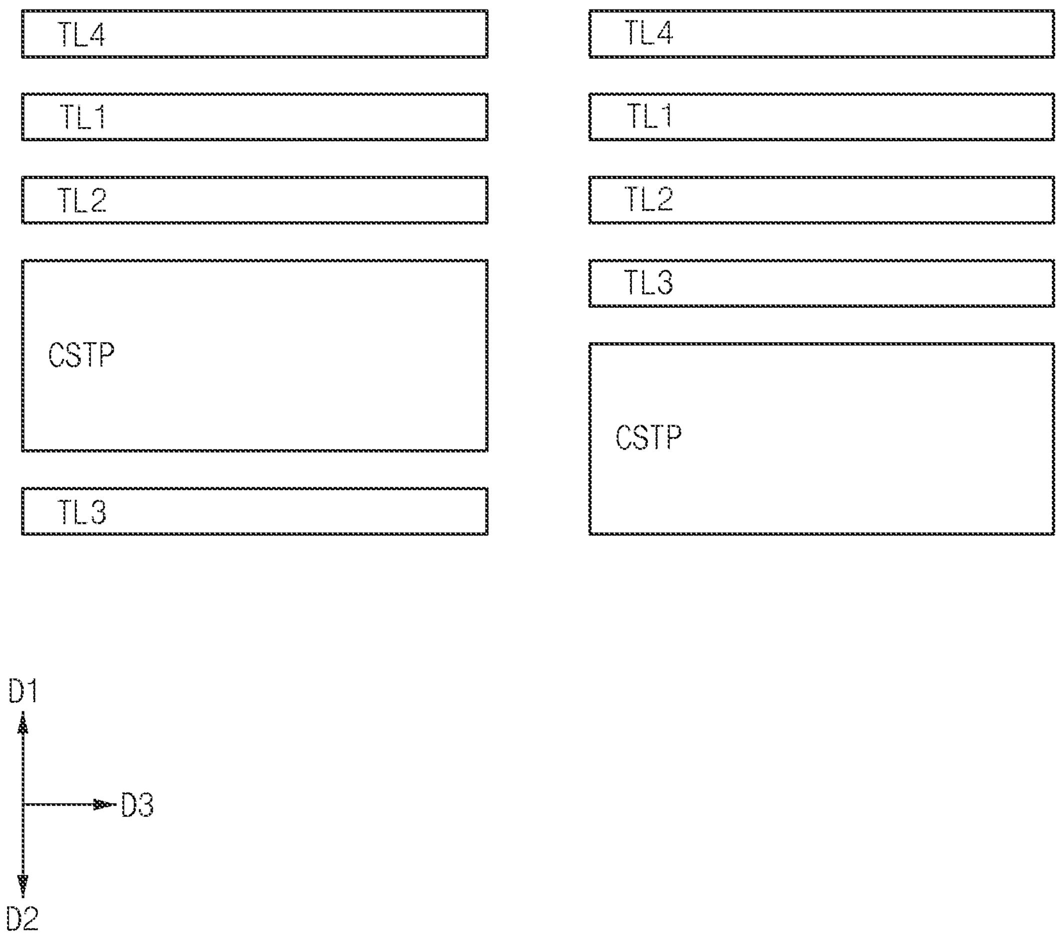
FIG. 8 is a diagram illustrating a layout of an embodiment of the pixel of FIG. 2.

FIG. 8 is a diagram illustrating a layout of an embodiment of the pixel of FIG. 2.

Referring to FIGS. 1 to 8, a layout of embodiments of a pixel of FIG. 8 may substantially the same as that of the pixel of FIG. 7 except for placement of the capacitor pattern CSTP. Therefore, any repetitive detailed description of the same or corresponding components as those described above will be omitted.

In an embodiment, the third transfer line TL3 may be disposed between the second transfer line TL2 and the capacitor pattern CSTP.

Figure 9:
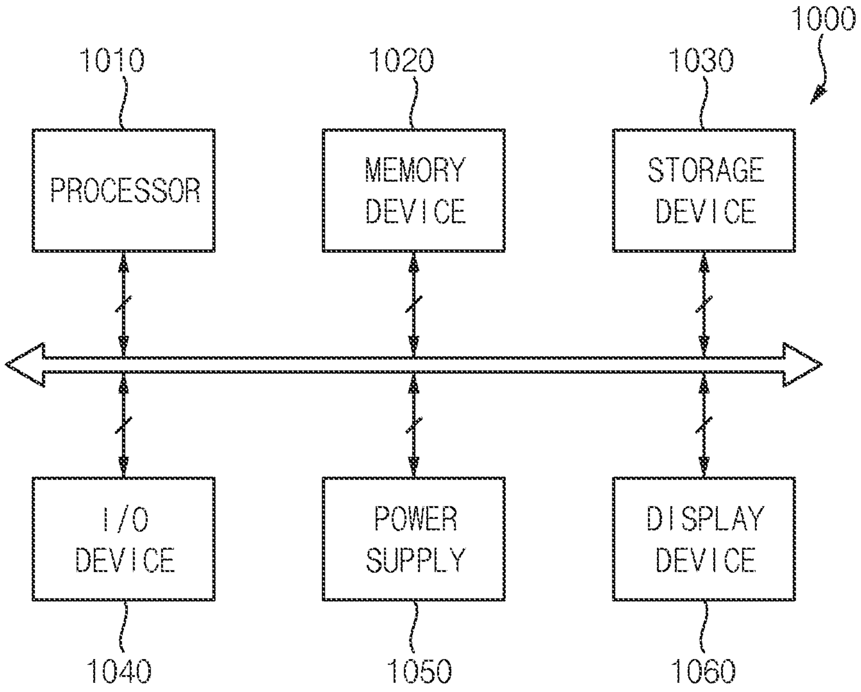
FIG. 9 is a block diagram illustrating an electronic device.
Figure 10:
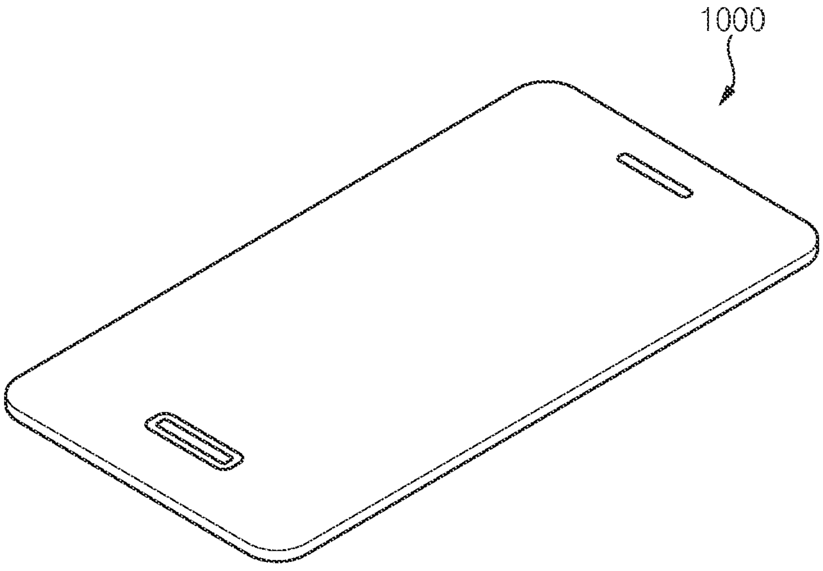
FIG. 10 is a diagram illustrating an embodiment in which the electronic device of FIG. 9 is implemented as a smart phone.

FIG. 9 is a block diagram illustrating an electronic device. FIG. 10 is a diagram illustrating an embodiment in which the electronic device of FIG. 9 is implemented as a smart phone.

Referring to FIGS. 9 and 10, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 10, the electronic device 1000 may be implemented as a smart phone. However, the electronic device 1000 is not limited thereto. In an alternative embodiment, for example, the electronic device 1000 may be implemented as a cellular phone, a video phone, a smart pad, a smart watch, a tablet computer, a car navigation system, a computer monitor, a laptop, a head mounted display (TIMID) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

Embodiments of the inventions may be applied to any display device and any electronic device including the touch panel, e.g., to a mobile phone, a smart phone, a tablet computer, a digital television (TV), a three-dimensional (3D) TV, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

The invention should not be construed as being limited to the embodiments set forth herein. Rather, these embodiments are provided so that this disclosure will be thorough and complete and will fully convey the concept of the invention to those skilled in the art.

What is claimed is:

1. A pixel comprising:

a first transistor which generates a driving current;

a light emitting element which emits light based on the driving current;

a second transistor which applies a data voltage to a second electrode of the first transistor in response to a write signal;

a third transistor which diode-connects the first transistor in response to the write signal;

a fourth transistor which applies a reference voltage to a gate electrode of the first transistor in response to an initialization signal;

a fifth transistor which applies a first power supply voltage to a first electrode of the first transistor in response to an emission signal;

a sixth transistor which connects the first transistor and the light emitting element in response to the emission signal;

a seventh transistor which applies an initialization voltage to an anode of the light emitting element in response to a bias signal;

an eighth transistor which applies a back gate control voltage to a back gate electrode of the first transistor in response to the bias signal;

a ninth transistor which connects the back gate electrode of the first transistor and the anode of the light emitting element in response to the emission signal; and a storage capacitor connected between the gate electrode of the first transistor and the seventh transistor.

2. The pixel of claim 1, wherein a first transfer line, to which the write signal is applied, is disposed apart from the first transistor in a first direction, a capacitor pattern constituting the storage capacitor is disposed apart from the first transistor in a second direction opposite to the first direction, and a second transfer line, to which the emission signal is applied, is disposed between the first transistor and the capacitor pattern.

3. The pixel of claim 2, wherein a third transfer line, to which the bias signal is applied, is disposed apart from the first transfer line in the second direction, and a fourth transfer line, to which the initialization signal is applied, is disposed apart from the first transfer line in the first direction.

4. The pixel of claim 3, wherein the third transfer line is disposed apart from the second transfer line in the second direction.

5. The pixel of claim 4, wherein the third transfer line is disposed between the second transfer line and the capacitor pattern.

6. The pixel of claim 4, wherein the third transfer line is disposed apart from the capacitor pattern in the second direction.

7. The pixel of claim 2, wherein the second transistor and the third transistor are commonly connected to the first transfer line.

8. The pixel of claim 2, wherein the fifth transistor, the sixth transistor, and the ninth transistor are commonly connected to the second transfer line.

9. The pixel of claim 3, wherein the seventh transistor and the eighth transistor are commonly connected to the third transfer line.

10. The pixel of claim 1, wherein a frame period for the pixel includes:

an anode initialization period in which the pixel performs an anode initialization operation;

a threshold voltage compensation period in which the pixel performs a threshold voltage compensation operation; and a light emitting period in which the pixel performs a light emitting operation.

11. The pixel of claim 10, wherein, in the anode initialization period, the eighth transistor is turned on in response to the bias signal having an active level to apply the back gate control voltage to the back gate electrode of the first transistor.

12. The pixel of claim 10, wherein, in the threshold voltage compensation period, the third transistor is turned on in response to the write signal having an active level to compensate for a threshold voltage of the first transistor.

13. The pixel of claim 10, wherein, in the light emitting period, the ninth transistor is turned on in response to the emission signal having an active level to apply a voltage of the back gate electrode of the first transistor to the anode.

14. A display device comprising:

a display panel including a pixel;

a gate driver which applies a write signal, an initialization signal, and a bias signal to the pixel;

an emission driver which applies an emission signal to the pixel; and a driving controller which controls the gate driver and the emission driver, wherein the pixel includes, a first transistor which generates a driving current;

a light emitting element which emits light based on the driving current;

a second transistor which applies a data voltage to a second electrode of the first transistor in response to the write signal;

a third transistor which diode-connects the first transistor in response to the write signal;

a fourth transistor which applies a reference voltage to a gate electrode of the first transistor in response to the initialization signal;

a fifth transistor which applies a first power supply voltage to a first electrode of the first transistor in response to the emission signal;

a sixth transistor which connects the first transistor and the light emitting element in response to the emission signal;

a seventh transistor which applies an initialization voltage to an anode of the light emitting element in response to the bias signal;

an eighth transistor which applies a back gate control voltage to a back gate electrode of the first transistor in response to the bias signal;

a ninth transistor which connects the back gate electrode of the first transistor and the anode of the light emitting element in response to the emission signal; and a storage capacitor connected between the gate electrode of the first transistor and the seventh transistor.

15. The display device of claim 14, wherein a first transfer line, to which the write signal is applied, is disposed apart from the first transistor in a first direction, a capacitor pattern constituting the storage capacitor is disposed apart from the first transistor in a second direction opposite to the first direction, and a second transfer line, to which the emission signal is applied, is disposed between the first transistor and the capacitor pattern.

16. The display device of claim 15, wherein a third transfer line, to which the bias signal is applied, is disposed apart from the first transfer line in the second direction, and a fourth transfer line, to which the initialization signal is applied, is disposed apart from the first transfer line in the first direction.

17. The display device of claim 16, wherein the third transfer line is disposed apart from the second transfer line in the second direction.

18. The display device of claim 17, wherein the third transfer line is disposed between the second transfer line and the capacitor pattern.

19. The display device of claim 17, wherein the third transfer line is disposed apart from the capacitor pattern in the second direction.

20. The display device of claim 14, wherein a frame period for the pixel includes:

an anode initialization period in which the pixel performs an anode initialization operation;

a threshold voltage compensation period in which the pixel performs a threshold voltage compensation operation; and a light emitting period in which the pixel performs a light emitting operation.

* * * * *